United States Patent
Iwanabe et al.

(10) Patent No.: US 9,633,810 B2
(45) Date of Patent: Apr. 25, 2017

(54) COMBINATION SWITCH

(71) Applicant: YAZAKI CORPORATION, Minato-ku, Tokyo (JP)

(72) Inventors: Takeshi Iwanabe, Makinohara (JP); Yoshizumi Hirayama, Kawasaki (JP); Hidetoshi Ichiyanagi, Kawasaki (JP)

(73) Assignee: YAZAKI CORPORATION, Tokyo (JP)

( * ) Notice: Subject to any disclaimer, the term of this patent is extended or adjusted under 35 U.S.C. 154(b) by 1029 days.

(21) Appl. No.: 13/875,354

(22) Filed: May 2, 2013

(65) Prior Publication Data
US 2013/0241311 A1 Sep. 19, 2013

Related U.S. Application Data

(63) Continuation of application No. PCT/JP2011/006204, filed on Nov. 7, 2011.

(30) Foreign Application Priority Data

Nov. 8, 2010 (JP) .................................. 2010-249338

(51) Int. Cl.
*B60L 1/00* (2006.01)
*H01H 47/00* (2006.01)
(Continued)

(52) U.S. Cl.
CPC ........... *H01H 47/002* (2013.01); *B60K 35/00* (2013.01); *B60Q 11/007* (2013.01); *G06F 11/10* (2013.01);
(Continued)

(58) Field of Classification Search
CPC ....... G06F 11/10; G07C 5/0825; B60K 35/00; B60Q 11/007; H04L 1/0062; H01H 47/002; Y10T 307/74
(Continued)

(56) References Cited

U.S. PATENT DOCUMENTS 5,561,416 A 10/1996 Marshall et al.
6,469,642 B1 10/2002 Kreppold
(Continued)

FOREIGN PATENT DOCUMENTS

CN 2009-64083 Y 10/2007
CN 2010-90994 Y 7/2008
(Continued)

OTHER PUBLICATIONS

The Chinese office action letter issued on Dec. 3,2014, in the counterpart Chinese patent application. (Application No. 201180053902.6).

*Primary Examiner* — Arnold Kinkead
(74) *Attorney, Agent, or Firm* — Mots Law, PLLC (57) ABSTRACT

A combination switch 10 outputs operation command signals to a driving system of a vehicle according to a switching operation of a switching unit 11 and includes a storage part 21 that stores determination information 21a indicating whether combinations of operation command signals to be outputted from switches of the switching unit 11 are abnormal or normal, a determination part 22 that refers to the determination information 21a in the storage part 21, determines whether or not a combination of the operation command signals is abnormal, and if an abnormal combination of the operation command signals continues longer than a predetermined time, adds, to the operation command signals, abnormality information indicating that the combination of the operation command signals is abnormal, and a communication part 13 that transmits the operation command signals added with the abnormality information.

11 Claims, 5 Drawing Sheets

(51) Int. Cl.
*G07C 5/08* (2006.01)
*G06F 11/10* (2006.01)
*B60K 35/00* (2006.01)
*B60Q 11/00* (2006.01)
*H04L 1/00* (2006.01)

(52) U.S. Cl.
CPC .......... *G07C 5/0825* (2013.01); *H04L 1/0082* (2013.01); *Y10T 307/74* (2015.04)

(58) Field of Classification Search
USPC .......... 714/737, 805; 701/36; 307/9.1, 10.8, 307/112
See application file for complete search history.

(56) References Cited

U.S. PATENT DOCUMENTS

| | | | |
|---|---|---|---|
| 2002/0008486 A1 | 1/2002 | Yabe | |
| 2010/0085082 A1 | 4/2010 | Katrak | |
| 2011/0289390 A1* | 11/2011 | Mayhew | H04L 1/0045 714/777 |

FOREIGN PATENT DOCUMENTS

| | | |
|---|---|---|
| CN | 101849226 A | 9/2010 |
| DE | 19653193 A1 | 7/1998 |
| EP | 1 176 066 A2 | 1/2002 |
| FR | 2732284 A1 | 10/1996 |
| FR | 2836974 A1 | 9/2003 |
| JP | H09-294427 A | 11/1997 |
| JP | H10-80010 A | 3/1998 |
| JP | 2002-37033 A | 2/2002 |
| JP | 2003-072490 A | 3/2003 |
| WO | 2005/059474 A1 | 6/2005 |

* cited by examiner

| INT | Lo | Hi | DETERMINATION RESULT |
|---|---|---|---|
| OFF | OFF | OFF | NORMAL |
| ON | OFF | OFF | NORMAL |
| OFF | ON | OFF | NORMAL |
| OFF | OFF | ON | NORMAL |
| ON | OFF | ON | ABNORMAL |
| ON | ON | ON | ABNORMAL |

COMBINATION SWITCH

CROSS REFERENCE TO RELATED APPLICATION

This application is a Continuation of PCT Application No. PCT/JP2011/006204, filed on Nov. 7, 2011, and claims the benefit of priority under 35 U.S.C. 119(a) to Japanese Patent Application No. 2010-249338 filed on Nov. 8, 2010 whose disclosed contents are cited herein.

BACKGROUND

Technical Field

The present invention relates to a combination switch capable of realizing switching operation in a vehicle.

Background Art

Operation levers to operate a wiper, turn lamp, and the like in a vehicle are arranged in the vicinity of a steering wheel and realize switching operation of the wiper, turn lamp, and the like through a combination switch that is interlocked with lever operation. The combination switch outputs operation command signals according to a switching operation of the combination switch, to drive the wiper, turn lamp, or the like of the vehicle, and therefore, it is important to improve the reliability of the combination switch on an operating side and the reliability of driven devices on an operated side. In connection with this, Japanese Patent No. 3756736 (Patent Document 1) proposes a wiper control apparatus that carries out a process to deal with the abnormality as a wiper motor causes abnormality.

SUMMARY OF INVENTION

Problem to be Solved by Invention

The wiper control apparatus mentioned in Patent Document 1 stops power supply when the wiper motor causes abnormality, and once the abnormality is removed, restarts power supply, thereby eliminating the need of enlarging MOSFETs more than necessity and reducing the size and cost of the apparatus. In addition, it improves the reliability of the apparatus including a driving circuit and motor.

The wiper control apparatus of Patent Document 1, however, considers nothing about abnormality in a combination of operation command signals outputted from the combination switch. For example, if a contact of a switch to change a wiper operation mode catches dust to output abnormal signals that turn on both an intermittent operation mode switch (INT) and a high-speed operation mode switch (Hi), the related art is unable to determine whether or not it is abnormal, and as a result, raises a problem of decreasing the reliability of the switch.

In consideration of the above-mentioned problem, the present invention provides a combination switch capable of improving reliability.

Solution to Problem

In order to solve the above-mentioned problem, the combination switch according to a technical aspect of the present invention has a switching unit capable of carrying out switching operation of switches and outputs operation command signals according to a switching operation of the switching unit. The combination switch includes a storage part, a determination part, and a communication part and provides the following features. Namely, the storage part stores determination information indicating whether combinations of operation command signals to be outputted from the switches of the switching unit are abnormal or normal, the determination part refers to the determination information in the storage part, determines whether or not a combination of the operation command signals is abnormal, and if an abnormal combination of the operation command signals continues longer than a predetermined time, adds, to the operation command signals, abnormality annunciation information indicating that the combination of the operation command signals is abnormal, and the communication part transmits the operation command signals added with the abnormality annunciation information.

DESCRIPTION OF EMBODIMENTS

With reference to the drawings, a combination switch according to a preferred embodiment of the present invention will be explained in detail.

Figure 1:
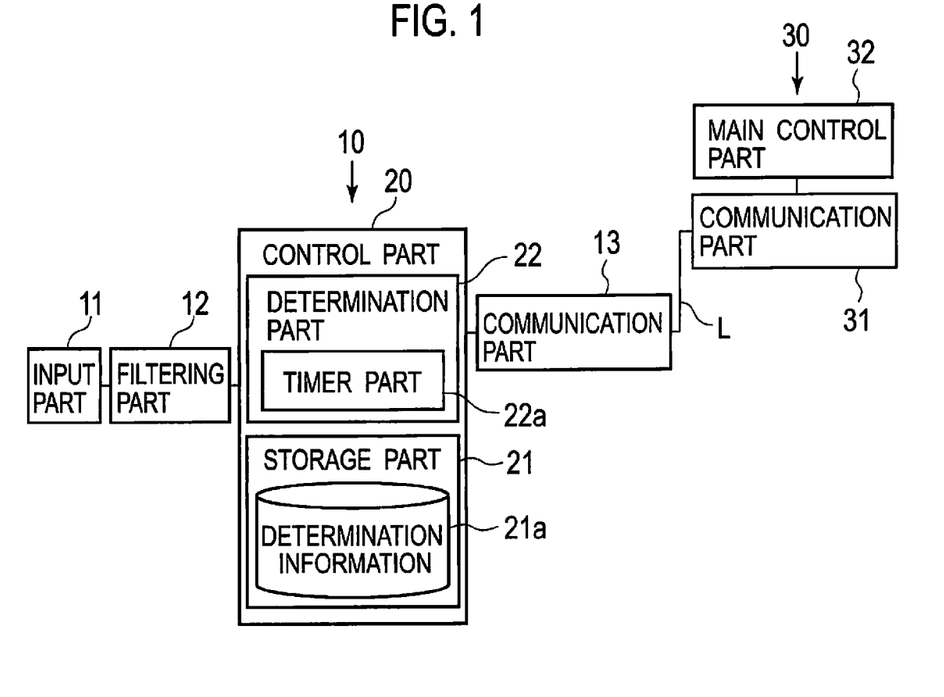
FIG. 1 is a block diagram illustrating a combination switch according to an embodiment of the present invention and a main control unit to control various parts of a vehicle.

FIG. 1 is a block diagram illustrating a combination switch 10 according to an embodiment of the present invention and a main control unit 30 to control various parts of a vehicle. As illustrated in FIG. 1, operation command signals outputted from the combination switch 10 are transmitted through an LIN (Local Interconnect Network) communication line L to the main control unit 30. Based on the operation command signals, the main control unit 30 controls a driving system of the vehicle. The combination switch 10 has an input part 11, a filtering part 12, a communication part 13, and a control part 20.

The input part 11 is an operation unit to operate various parts of the vehicle, for example, a body system of the vehicle. The input part 11 serves as a switching unit that switches, through a lever operation or the like, a turn switch, a wiper switch, and the like. In response to a lever operation carried out by an operator, the input part 11 outputs operation command signals corresponding to a switching operation. In the present embodiment, the input part 11 is explained in connection with a turn switch. The turn switch is operated and switched according to a traveling direction of the vehicle and outputs operation command signals for left and right turn lamps to the main control unit 30.

More precisely, when the operator carries out a lever operation to blink the left turn lamp, a switch (hereinafter referred to as TurnL) to output an operation command signal for the left turn lamp turns on and a switch (hereinafter referred to as TurnR) to output an operation command signal for the right turn lamp turns off. The ON signal of TurnL and OFF signal of TurnR are transmitted as operation command signals to the main control unit 30.

On the other hand, if the operator carries out a lever operation to blink the right turn lamp, OFF signal of TurnL and ON signal of TurnR are transmitted as operation command signals to the main control unit 30.

When the operator carries out a lever operation to go straight, OFF signal of TurnL and OFF signal of TurnR are transmitted as operation command signals to the main control unit 30.

The filtering part 12 is realized by a delay circuit. The filtering part 12 serves as a temporal filtering part, and if a predetermined time passes after a change occurs in output command signals outputted from the input part 11, outputs the changed operation command signals. The filtering part 12 prevents an erroneous detection of a switching operation due to noise.

The communication part 13 transmits operation command signals outputted from the control part 20. The communication part 13 converts the signals outputted from the control part 20 into signals suitable for the LIN communication line L.

The control part 20 is realized by, for example, a CPU and controls the processes and operations of the respective parts of the combination switch 10. The control part 20 carries out predetermined input/output control for information to be inputted and outputted to and from the respective parts of the combination switch 10 and executes predetermined processes on the information. The control part 20 has a storage part 21 and a determination part 22.

The storage part 21 electrically stores information. The storage part 21 has a ROM (not illustrated) to store programs and the like to make the control part 20 execute various processes and a RAM (not illustrated) that is a readable-writable memory to store various data and keep an area for executing processes of the CPU. The storage part 21 stores determination information 21a.

The determination information 21a is information concerning abnormal combinations of operation command signals to be outputted from switches of the input part 11. More precisely, the determination information 21a is information that relates a combination of operation command signals from the input part 11 to a determination result of whether or not the combination is normal.

Figure 2:
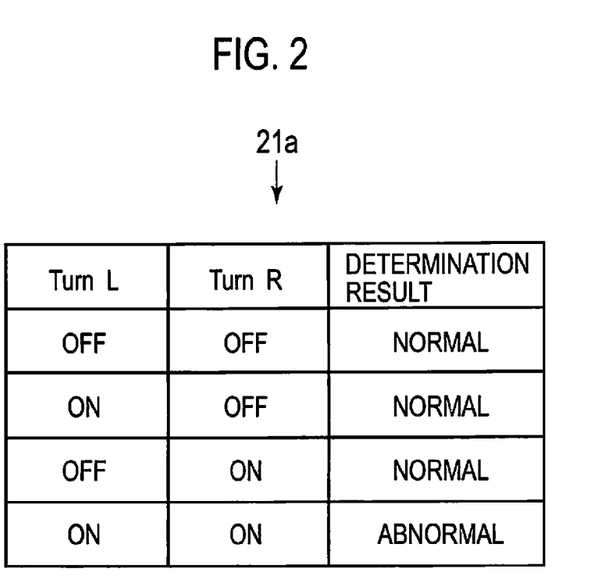
FIG. 2 illustrates relationship of ON/OFF combinations of TurnL and TurnR and determination results of whether the combinations are normal or abnormal.

For example, FIG. 2 illustrates information that relates ON/OFF combinations of TurnL and TurnR to determination results of whether the combinations are normal or abnormal. As illustrated in FIG. 2, a both ON combination of TurnL and TurnR is abnormal and the other combinations, i.e., any combination with one of TurnL and TurnR being ON and a both OFF combination of TurnL and TurnR are normal.

The determination part 22 determines whether or not a set of operation command signals from any switch of the input part 11 is an abnormal combination. The determination part 22 has a timer part 22a. The timer part 22a has a timer function, and if an abnormal combination is detected according to the combinations of operation command signals stored in the determination information 21a, starts to count time.

If the determination part 22 determines abnormality according to the determination information 21a stored in the storage part 21 and if the abnormality determination continues for a predetermined time (Tb sec), the determination part 22 adds abnormality annunciation information indicating the abnormality to the operation command signals and transmits the operation command signals added with the abnormality annunciation information through the communication part 13 to the main control unit 30. If it is determined that the output signals from the input part 11 are normal, the determination part 22 transmits the normal-state operation command signals to the main control unit 30. The predetermined time (Tb sec) is properly set according to, for example, the kind of the input part 11.

The main control unit 30 has a communication part 31 and a main control part 32. The communication part 31 converts signals conforming to the LIN communication line L into output signals to the main control part 32. The main control part 32 is realized by, for example, a CPU and is electrically connected to respective parts of the vehicle, such as the turn lamp and wiper, to control the blinking of the turn lamp and the driving of the wiper.

If abnormality is found according to the combinations of operation command signals stored in the determination information 21a, the combination switch 10 transmits abnormality annunciation information indicating that the combination switch 10 is abnormal to the main control unit 30. Upon receiving the abnormality annunciation information from the combination switch 10, the main control unit 30 carries out a process such as displaying the abnormality annunciation information on a display unit.

Figure 3:
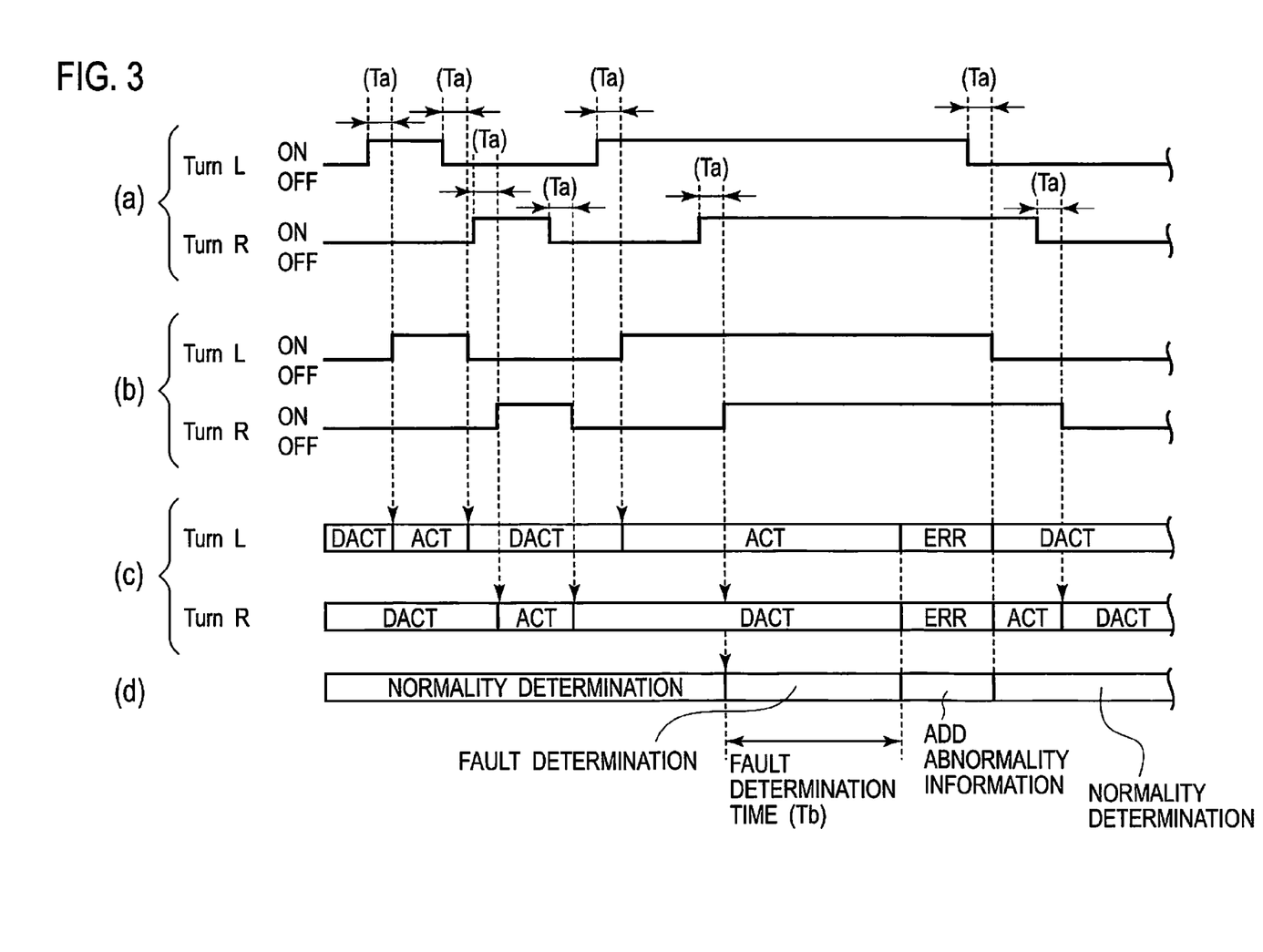
FIG. 3 is a timing chart illustrating the timing of transmitting, from the combination switch to the main control unit, abnormality annunciation information indicating that a combination of operation command signals from an input part is abnormal.

With reference to FIG. 3, the timing of transmitting abnormality annunciation information indicating that a combination of operation command signals from the input part 11 is abnormal from the combination switch 10 to the main control unit 30 will be explained. FIG. 3 is a timing chart illustrating the timing of transmitting abnormality annunciation information indicating that a combination of operation command signals from the input part 11 is abnormal, transmitted from the combination switch 10 to the main control unit 30.

As illustrated in FIG. 3, values of operation command signals for TurnL and TurnR are filtered (FIG. 3(a)) through the filtering part 12 with a filtering time of Ta (sec), to provide definite values (FIG. 3(b)) of the operation command signals. With this, signals from which the influence of disturbance is eliminated are provided as operation command signals for TurnL and TurnR.

Information transmitted to the main control unit 30 is normal if the definite values of both TurnL and TurnR are not ON and an ON operation command signal (ACT) or an OFF operation command signal (DACT) is transmitted for each of TurnL and TurnR to the main control unit 30 (FIG. 3(c)).

The determination part 22 determines whether or not the operation command signals TurnL and TurnR are normal (FIG. 3(d)) by use of the definite values of TurnL and TurnR as their operation command signals. If the definite values of TurnL and TurnR are both ON to determine that the operation command signals are abnormal, the determination part 22 starts fault determination.

The fault determination is carried out for the predetermined time (Tb sec), and if the abnormality of the output signals continues for the predetermined time, it is determined that each of the operation command signals TurnL and TurnR is abnormal. Abnormality annunciation information indicating that TurnL is abnormal and abnormality annunciation information indicating that TurnR is abnormal are added to the operation command signals, which are transmitted to the main control unit 30.

Until the time Tb passes after the start of the fault determination, i.e., until the determination part 22 provides a determination result, one of TurnL and TurnR that has turned on first (TurnL, according to the present embodiment) is kept on and the other that has turned on thereafter (TurnR, according to the present embodiment) is kept off. This prevents the abnormal output signals indicating that both TurnL and TurnR are ON from being transmitted to the ma in control unit 30 during the fault determination time (Tb sec).

During a period in which the abnormal combination of definite values is continuously outputted, the abnormality annunciation information indicating the abnormality is added to the operation command signals, which are continuously transmitted to the main control unit 30. If the definite values of TurnL and TurnR turn to a normal combination when dust at a switch contact is removed, for example, normality annunciation information indicating the normality is added instead of the abnormality annunciation information to the operation command signals, which are transmitted to the main control unit 30 (FIG. 3(c)).

Figure 4:
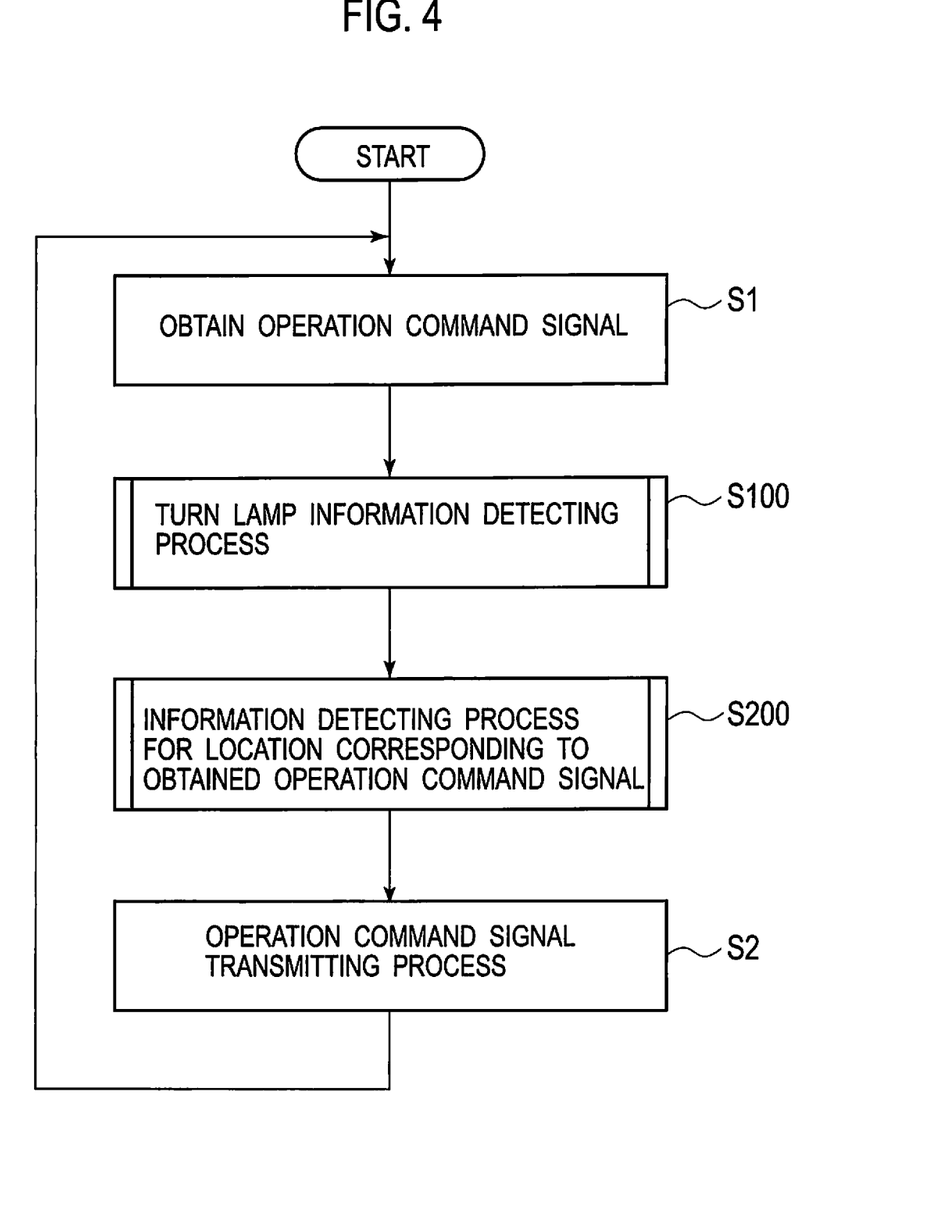
FIG. 4 is a flowchart generally illustrating an operation command signal transmitting process carried out by the combination switch.
Figure 5:
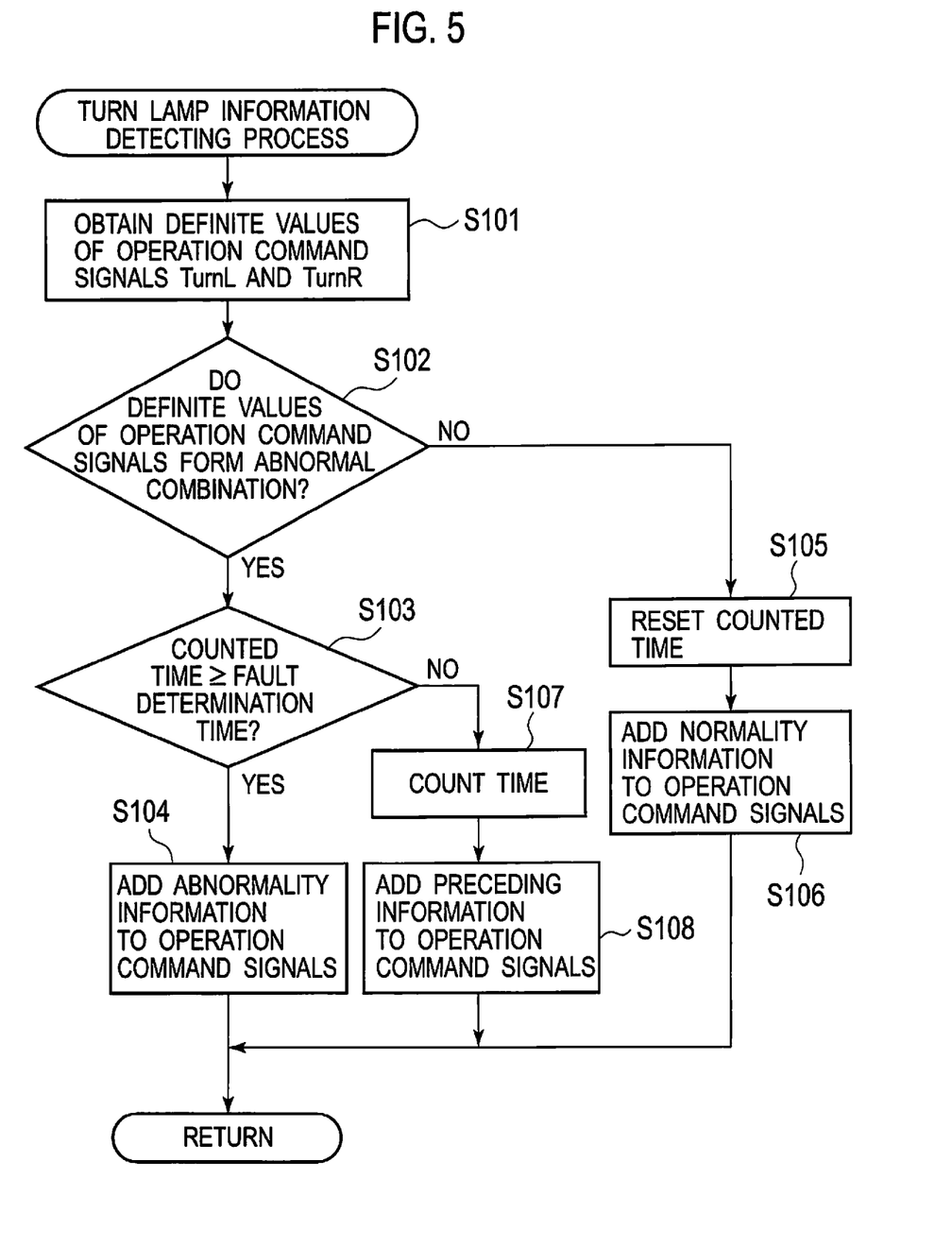
FIG. 5 is a flowchart illustrating a detecting process of a turn lamp annunciation information illustrated in FIG. 4.

An operation command signal transmitting process carried out by the combination switch 10 will be explained with reference to a flowchart. FIG. 4 is the flowchart generally illustrating the transmitting process of the operation command signal that is carried out by the combination switch 10. FIG. 5 is a flowchart illustrating a detecting process of a turn lamp annunciation information as illustrated in FIG. 4.

The operation command signal transmitting process carried out by the combination switch 10 will generally be explained with reference to FIG. 4.

When a power source is turned on, the combination switch 10 obtains operation command signals as illustrated in FIG. 4 (step S1). The operation command signals are outputted when an operator operates the combination switch 10 with a lever, for example.

Thereafter, the combination switch 10 carries out the detecting process of the turn lamp annunciation information (step S100). Thereafter, the combination switch 10 carries out a detecting process of an annunciation information for a location corresponding to the obtained operation command signals (step S200).

The combination switch 10 transmits the operation command signals added with annunciation information to the main control unit 30 (step S2).

Thereafter, the combination switch 10 returns to step S1 and repeats the above-mentioned steps.

With reference to FIG. 5, the turn lamp information detecting process illustrated in FIG. 4 will be explained. As illustrated in FIG. 5, the combination switch 10 obtains definite values of the operation command signals TurnL and TurnR filtered through the filtering part 12 (step S101).

Thereafter, the determination part 22 of the combination switch 10 determines whether or not a combination of the definite values of the operation command signals TurnL and TurnR is abnormal (step S102). This determination is carried out by referring to the determination information 21a stored in the storage part 21.

In a case where the determination part 22 determines that a set of the definite values of the operation command signals is an abnormal combination (Yes in step S102), it is determined whether or not the fault determination time has passed (step S103). If the fault determination time has passed (Yes in step S103), the combination switch 10 adds abnormal annunciation information indicating that the operation command signal is abnormal to each of the operation command signals (step S104). Thereafter, the combination switch 10 returns to the main routine.

In a case where the determination part 22 determines in step S102 that the definite values of the operation command signals TurnL and TurnR do not form an abnormal combination (No in step S102), the combination switch 10 resets the time counted by the timer part 22a (step S105) and adds normality annunciation information indicating that the operation command signal is normal to each of the operation command signals (step S106). Thereafter, the combination switch 10 returns to the main routine.

If it is determined in step S103 that the fault determination time has not passed yet (No in step S103), the combination switch 10 counts time (step S107). Thereafter, the combination switch 10 adds preceding annunciation information to the operation command signals (step S108) and returns to the main routine.

Figure 6:
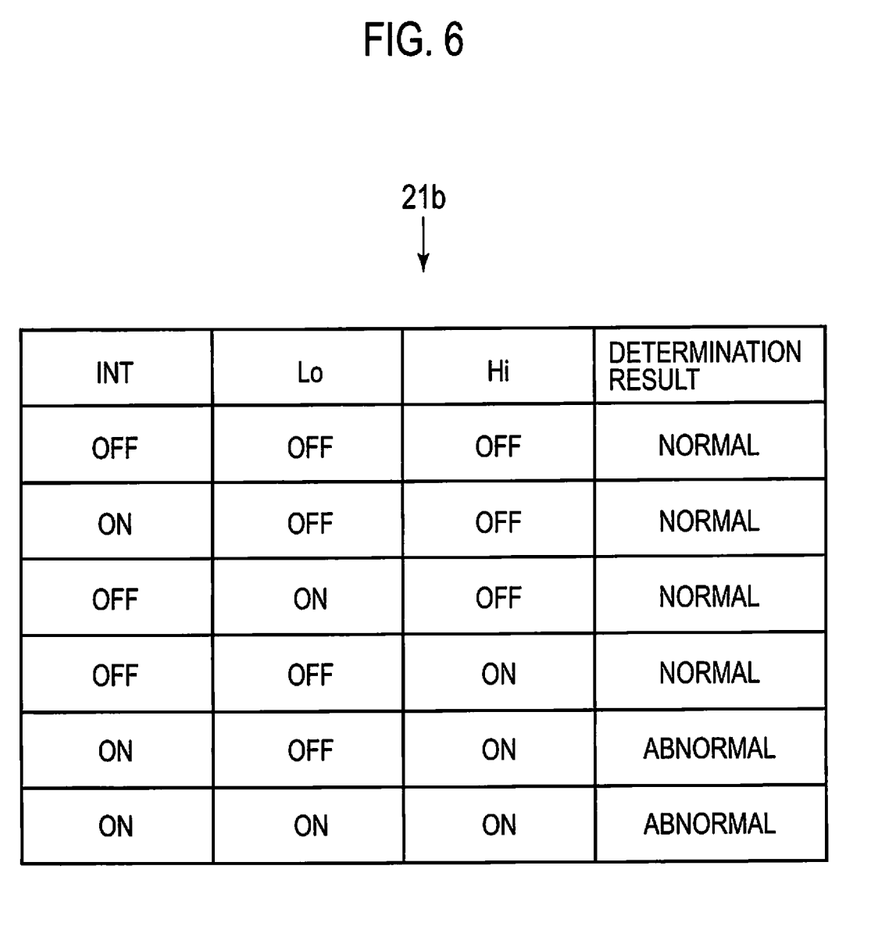
FIG. 6 illustrates information that relates combinations of operation command signals outputted from a wiper switch to determination results indicating whether the combinations are normal or abnormal.

The process in step S200 illustrated in the flowchart of FIG. 4 is, for example, a transmitting process of a wiper abnormality annunciation information. This process is the same as the transmitting process of the turn lamp abnormality annunciation information of step S100, and therefore, explanation thereof is omitted. In the case of the transmitting process of wiper abnormality annunciation information, determination information 21b illustrated in FIG. 6 is stored in the storage part 21. FIG. 6 illustrates information that relates combinations of operation command signals to be outputted from a wiper switch to determination results indicating whether the combinations are normal or abnormal. The determination part 22 refers to the determination information 21b and determines whether or not a given combination of operation command signals is abnormal.

A wiper switching operation is an operation to change an intermittent operation mode switch (INT), a low-speed operation mode switch (Lo), and a high-speed operation mode switch (Hi) from one to another with, for example, a lever. As illustrated in FIG. 6, operation command signals indicating that the intermittent operation mode switch (INT) and high-speed operation mode switch (Hi) are both ON, or operation command signals indicating that the intermittent operation mode switch (INT), low-speed operation mode switch (Lo), and high-speed operation mode switch (Hi) are all ON are determined to be abnormal by the determination part 22.

It is preferable that the detecting process of annunciation information 100 and 200 are carried out only when requested by the main control unit 30.

The combination switch 10 according to the embodiment of the present invention has the storage part 21 that stores the determination information 21a concerning whether a combination of the operation command signals TurnL and TurnR outputted from the input part 11 is abnormal or normal, the determination part 22 that refers to the determination information 21a in the storage part 21, determines whether or not a combination of the operation command signals is abnormal, and if an abnormal combination of the operation command signals continues longer than a predetermined time (Tb sec), adds abnormality annunciation information indicating that the combination of the operation command signals is abnormal to the operation command signals, and the communication part 13 that transmits the operation command signals to the main control unit 30 that is a control source of a vehicle. If an abnormal combination of operation command signals occurs, abnormality annunciation information is added to the operation command signals and the operation command signals are transmitted to the main control unit 30. Accordingly, the main control unit 30 displays the abnormality annunciation information on, for example, a display unit, to alarm the abnormality. This improves the reliability of the combination switch 10.

The combination switch 10 according to the embodiment of the present invention adds, if an abnormal combination of operation command signals continues longer than the predetermined time (Tb sec), abnormality annunciation information indicating that the combination of operation command signals is abnormal to the operation command signals. This improves the reliability of determination made by the determination part 22.

The combination switch 10 according to the embodiment of the present invention filters operation command signals through the filtering part 12 and provides definite values of the operation command signals. With the use of the operation command signals from which the influence of noise is eliminated, the embodiment determines whether or not a combination of the operation command signals is abnormal. This improves the reliability of determination made by the determination part 22.

The combination switch 10 according to the embodiment of the present invention connects the communication part 13 to the LIN communication line L. Accordingly, connection to the main control unit 30 is realized by a simple configuration, i.e., a single wire system characteristic to the LIN communication.

Although the combination switch 10 according to the embodiment connects the combination switch 10 to the main control unit 30 through the LIN communication line, this does not limit the present invention. For example, the combination switch 10 and main control unit 30 may be connected to each other through a CAN (Controller Area Network).

Although the combination switch 10 according to the embodiment adds normality annunciation information indicating that operation command signals are normal to the operation command signals, it is possible to add annunciation information to operation command signals only when the operation command signals are abnormal. Namely, if the operation command signals are normal, no information will be added to the operation command signals.

Although the combination switch 10 according to the embodiment adds abnormality annunciation information to operation command signals, this does not limit the present invention. It will be sufficient if the abnormality annunciation information is transmitted to the main control unit 30. Namely, the abnormality annunciation information may be transmitted separately from the operation command signals.

The invention claimed is:

1. A combination switch that has a switching unit capable of carrying out switching operation of switches and outputs operation command signals according to a switching operation of the switching unit, comprising:
    a temporal filtering part coupled to the switching unit, the temporal filtering part configured to filter the operation command signals;
    a storage part configured to store determination information indicating whether combinations of operation command signals to be outputted from the switches of the switching unit are abnormal or normal;
    a determination part configured to
    determine whether or not a combination of the operation command signals is abnormal with reference to the determination information in the storage part, and
    if an abnormal combination of the operation command signals continues longer than a predetermined time, add abnormality annunciation information indicating that the combination of the operation command signals is abnormal to the operation command signals; and
    a communication part configured to transmit the operation command signals added with the abnormality annunciation information.

2. The combination switch of claim 1, wherein
    the temporal filtering part is further configured to output changed operation command signals when a predetermined time passes after the operation command signals outputted from the switching unit change, and
    the determination part determines whether or not a combination of the operation command signals outputted from the temporal filtering part is abnormal.

3. The combination switch of claim 1, wherein the communication part is connected to a (Local Interconnect Network) LIN communication line.

4. The combination switch of claim 2, wherein the temporal filtering part comprises a delay circuit.

5. The combination switch of claim 3, wherein the communication part converts the operation command signals into signals suitable for the LIN communication line.

6. The combination switch of claim 1, wherein the determination information comprises information that relates the combination of operation command signals from a determination result of whether or not the combination is normal.

7. The combination switch of claim 6, wherein
    the switch is a turn switch configured to generate a TurnL operation command signal and a TurnR operation command signal, and
    the determination information relates ON/OFF combinations of the TurnL and TurnR operation command signals of the turn switch to determination results of whether the combinations are normal or abnormal such that
    a both ON combination of TurnL and TurnR is abnormal, and
    any combination with one of TurnL and TurnR being ON, and a both OFF combination of TurnL and TurnR are normal.

8. The combination switch of claim 7, wherein the determination part comprises a timer part, and if the abnormal combination is detected according to the combinations of operation command signals stored in the determination information, the timer part starts to count a time.

9. The combination switch of claim 8, wherein if the determination part determines that definite values of the operation command signals TurnL and TurnR do not form an abnormal combination, the time counted by the timer is reset.

10. The combination switch of claim 1, wherein the adding of annunciation information is carried out based on a request.

11. The combination switch of claim 2, wherein the temporal filtering part is further configured to filter the operation command signals to provide definite values of the operation command signals.

* * * * *